United States Patent
Saunders et al.

(10) Patent No.: US 8,024,781 B2
(45) Date of Patent: Sep. 20, 2011

(54) SIGNING-IN TO SOFTWARE APPLICATIONS HAVING SECURED FEATURES

(75) Inventors: Stillman T. Saunders, Sammamish, WA (US); Ignacio Ariel Coloma, Sammamish, WA (US); Vishal Gupta, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 693 days.

(21) Appl. No.: 10/309,650

(22) Filed: Dec. 4, 2002

(65) Prior Publication Data

US 2004/0111620 A1    Jun. 10, 2004

(51) Int. Cl.
*G06F 7/04* (2006.01)
(52) U.S. Cl. .................................. 726/5; 726/6
(58) Field of Classification Search .............. 726/5–9
See application file for complete search history.

(56) References Cited

U.S. PATENT DOCUMENTS

| | | | |
|---|---|---|---|
| 5,774,551 A | 6/1998 | Wu et al. | 380/25 |
| 6,161,139 A * | 12/2000 | Win et al. | 709/225 |
| 6,182,142 B1 | 1/2001 | Win et al. | 709/229 |
| 6,718,332 B1 | 4/2004 | Sitaraman et al. | 707/102 |
| 6,904,526 B1 | 6/2005 | Hongwei | 713/182 |
| 7,254,831 B2 | 8/2007 | Saunders et al. | 726/8 |
| 2001/0054157 A1 | 12/2001 | Fukumoto | 713/201 |
| 2002/0023059 A1 | 2/2002 | Bari et al. | 705/76 |
| 2002/0032731 A1 | 3/2002 | Qian et al. | 709/204 |
| 2002/0095571 A1 | 7/2002 | Bradee | 713/164 |
| 2003/0163513 A1 | 8/2003 | Schaeck et al. | 709/201 |
| 2003/0226017 A1 | 12/2003 | Palekar et al. | 713/168 |
| 2004/0103202 A1 | 5/2004 | Hildebrand et al. | 709/229 |
| 2004/0111620 A1 | 6/2004 | Saunders et al. | 713/182 |

FOREIGN PATENT DOCUMENTS

| | | |
|---|---|---|
| EP | 1089516 A2 | 9/2000 |
| JP | 7-134696 | 5/1995 |
| JP | 10-105516 | 4/1998 |
| JP | 63-276158 | 11/1998 |
| JP | 2000-259566 | 9/2000 |
| JP | 2002-41380 | 2/2002 |
| WO | WO 00/54151 | 9/2000 |

OTHER PUBLICATIONS

Michael McBride et al., "The KDE Control Center," Chapter 5—Modules, The Desktop Environment, Apr. 2, 2001.
David P. Kormann et al., "Risks of the Passport Single Signon Protocol," Computer Networks, vol. 33, pp. 51-58 (2000).

(Continued)

*Primary Examiner* — Jacob Lipman
(74) *Attorney, Agent, or Firm* — Merchant & Gould

(57) ABSTRACT

The present invention automatically signs or logs a user in to access secured features within a software application without prompting manual intervention when a user starts the software application having secured features. When the software application is started and an automatic sign-in condition is enabled, the software application transitions to a signed-in or logged-in state as long as security criteria are met. As a result, unnecessary and repetitive steps are avoided when signing-in. The automatic sign-in condition may be enabled through initial system setup, from a prompt to enter a credential, or through a service options menu. The present invention improves network efficiency by limiting network transmissions to an as needed basis. The automatic sign-in condition is capable of roaming to other computers within a network, thereby following mobile users. Further, the automatic sign-in condition is controllable by network administrative policy, giving network administrators the ability to disable its functionality when desired.

38 Claims, 8 Drawing Sheets

OTHER PUBLICATIONS

Diego R. López et al., "Ubiquitous Internet Access Control: The PAPI System," Computer Society, pp. 1-5 (2002).
European Patent Office, European Search Report, Application No. EP03026014, Apr. 12, 2005, pp. 1-2.
Official Action in U.S. Appl. No. 10/309,651, dated Feb. 7, 2007 (9 pages).
Official Action in U.S. Appl. No. 10/309,651, dated May 8, 2006.
Official Examination Report in EP Application No. 03 026 014.5-2201, dated Feb. 19, 2007.
Official Examination Report in EP Application No. 03 026 073.1-2201, dated Feb. 19, 2007.
Chu et al., "Web-Based Single Sign-On Solutions: An SSO Product Matrix," Computer Security Journal, vol. XVI, pp. 39-49, Nov. 1, 2000.
European Communication dated Mar. 2, 2009 in European Patent Application No. 03 026 014.5.
Japanese Notice of Rejection mailed Feb. 2, 2010 in Japanese Patent Application No. 2003-406557.
Japanese Notice of Rejection mailed Jun. 11, 2010 in Japanese Patent Application No. 2003-406557.
European Communication dated Mar. 2, 2009 in European Patent Application No. 03 026 073.1.
European Summons to Attend Oral Proceedings dated Aug. 5, 2010 in European Patent Application 03 026 073.1.
Japanese Notice of Rejection mailed Feb. 23, 2010 in Japanese Patent Application No. 2003-406558.
Japanese Notice of Rejection mailed Jun. 15, 2010 in Japanese Patent Application No. 2003-406558.
Ayako Hattori, "What Information is to be Sent to MS?" *Nikkei Personal Computing*, No. 403, pp. 134-138, Nikkei Business Publications, Inc., Japan, Feb. 14, 2002.
Matt Rosoff, "Transition from Closed System to Trust Broker: Passport Aiming at Integration of Authentication System," Directions on Microsoft, No. 1, p. 34, pp. 43-47, Media Select, Co., Ltd., Japan, Dec. 15, 2001.

* cited by examiner

SIGNING-IN TO SOFTWARE APPLICATIONS HAVING SECURED FEATURES

TECHNICAL FIELD

The present invention generally relates to computer systems that authenticate the identity of users or computing devices. More specifically, the present invention relates to computer operations for signing-in to software applications having secured features.

BACKGROUND OF THE INVENTION

Today's software applications are manufactured with network service capability that requires users and computers to verify their identity by signing-in to access secured features within software applications and thereby connecting to authentication services.

Authentication services such as PASSPORT.NET available from MICROSOFT CORPORATION of Redmond, Wash. are becoming an integral part of software applications needing to authenticate users for access to secured features. These authentication services control access to secured features within software applications and provide identity and authentication services for network users. For instance, a secured network fax service used from within a word processing application would require the entry of a username and password to authenticate the identity of the user and authorize use of the network fax service. Once identity is authenticated, the authentication operation acts as an authentication gateway by allowing users to securely access network services within the word processing application without entering a username and password at every network service or website accessed during the signed in session.

However users must still enter a username and password or click a sign-in button to initially access secured features within a software application. One drawback of current sign-in operations is their pervasiveness, requiring user intervention with an interface to sign-in to secured software features on a repetitive basis. This must be done every time a user signs-in after closing a software application with secured features. For instance, if a user wants to use a secured feature within a software application the user must start the application and either type in a username and password or click on an interface button to enter a saved password. If the user changes computers the benefit of a saved password is lost and the user is again prompted to enter a username and password. These drawbacks have an annoying affect on users who access secured features on a regular basis.

Further, some web-based cookie operations save passwords and usernames but still have a number of drawbacks. First of all the web-based systems still require user prompts and intervention with saved password displays. Secondly, the 'save password' functionality is lost if the user changes computers. Lastly, sign-in operations are not controllable by network administrative policy and are not adaptable to network preferences.

It is with respect to these considerations and others that the present invention has been made.

SUMMARY OF THE INVENTION

In accordance with the present invention, the above and other problems are solved by automatically signing-in to access secured features within software applications. The present invention automatically signs a user in without user interface prompts or manual intervention when a user starts a software application having secured features. When a software application is started and an automatic sign-in condition is enabled, the software application transitions to a signed-in state as long as security criteria are met. The transition to a signed-in state takes place without prompting a user to enter a credential (e.g. username and password). As a result, unnecessary and repetitive steps are avoided when signing-in and intrusive pop-up sign-in dialogs at random intervals are less likely while using the software application.

Another feature of the present invention is that the automatic sign-in condition is initiated in a number of ways. An automatic sign-in condition may be initiated through initial system setup, from a prompt to enter a credential, or through a service options menu. This feature permits the software applications in a suite to each have an enabled automatic sign-in condition. This enhances the ability of the software applications to work well together.

In another feature of the present invention, credential information is stored in an encrypted format as a domain credential. Further, a registry key is set, thereby enabling an automatic sign-in condition. This offers advantages of added security and roaming capabilities.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier, readable by a computing system and encoding a computer program of instructions for executing a computer process.

An advantage of the present invention is that network efficiency is improved because network transmissions are executed on an as-needed basis. Although the software application is in a signed-in state, network traffic is reduced by only making network transmissions when secured features are requested.

Another advantage of the present invention is that the automatic sign-in condition is capable of roaming to other computers within a network, thereby following mobile users. A further advantage of the present invention is that the automatic sign-in condition is controllable by network administrative policy, giving network administrators the ability to disable its functionality when desired.

The great utility of the invention is that after starting a software application, users are automatically signed-in to access secured features within the software application without utilizing user prompts for credential entry and requiring manual intervention.

These and various other features as well as advantages, which characterize the present invention, will be apparent from a reading of the following detailed description and review of the associated drawings.

BRIEF DESCRIPTION OF THE DRAWINGS

FIG. 6 illustrates an embodiment of the present invention where an automatic sign-in condition is enabled from a credential request prompt displayed after a request to sign-in;

DETAILED DESCRIPTION OF THE INVENTION

Figure 1:
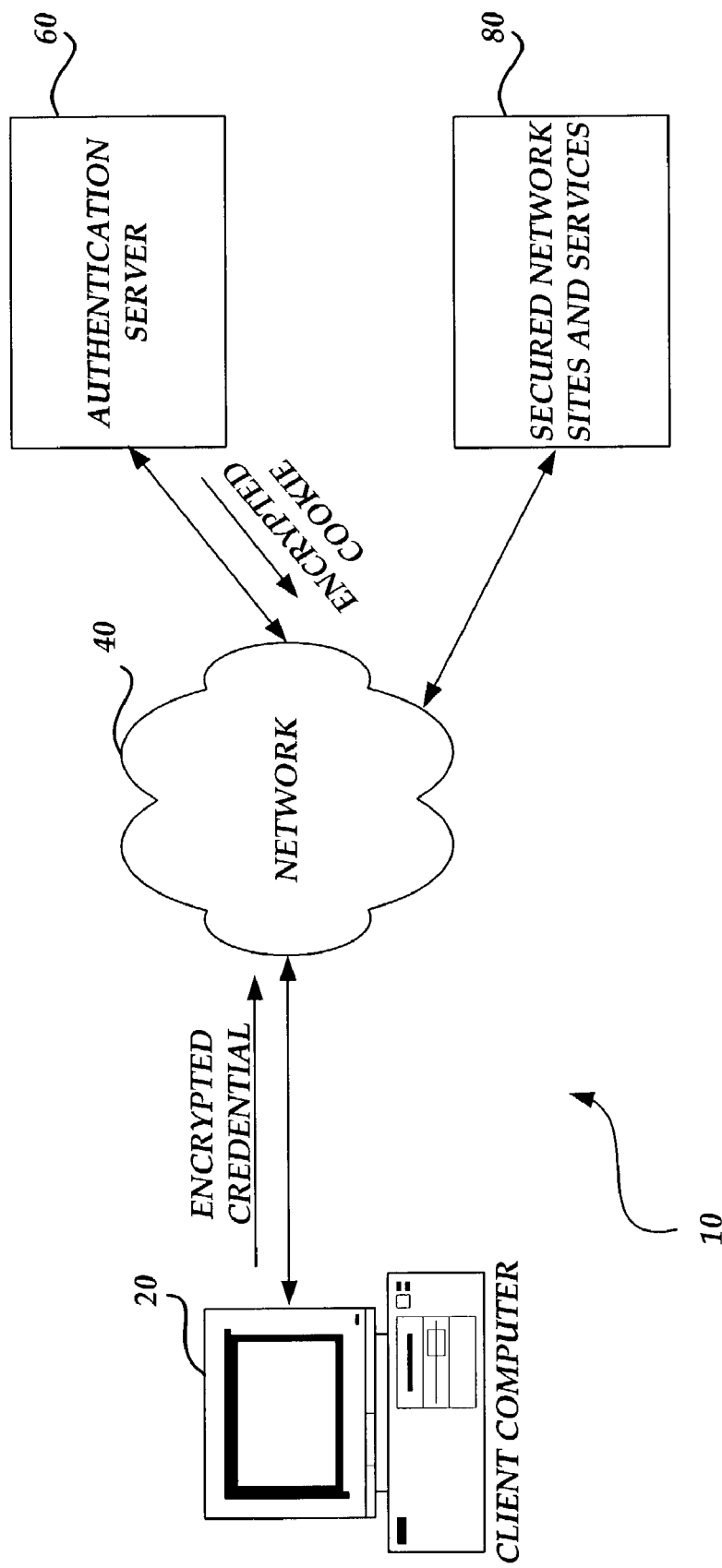
FIG. 1 is a diagram illustrating system architecture utilized in an actual embodiment of the present invention.

Referring to FIG. 1, an illustrative diagram showing a system architecture 10 utilized in an actual embodiment of the present invention will be described. As shown in FIG. 1, a client computer 20 is provided that connects to an authentication server 60 through a network 40. According to one actual embodiment described herein, the client computer 20 comprises a standard personal computer that connects to a network 40, such as the Internet through a connection, such as a Digital Subscriber Line or a cable modem. However, it should be appreciated that the client computer 20 may comprise another type of computing device such as a personal digital assistant and may be connected to the network 40 through another type of connection, such as a dial up or satellite connection.

The client computer 20 is capable of executing a standard Web browser application program such as INTERNET EXPLORER from MICROSOFT CORPORATION of Redmond, Wash. The Web browser application program may be utilized to access secured network sites and services 80 if the client computer 20 has an authenticated credential. A credential is authenticated after the client computer 20 transmits the credential to the authentication server 60 through the network 40. The authentication server 60 authenticates the identity of users before granting a user access to secured services or websites 80. For instance, before a user of client computer 20 may access a secured faxing or printing service within a word processing software application equipped with secured faxing and printing features, the user must submit a credential (e.g. username and password) to the authentication server 60 via the network 40.

Client computer 20 prompts the user to sign-in or login to access secured features within the software application with a credential whenever a secured feature within the software application is requested. However, when a condition of automatic sign-in is enabled on client computer 20, the necessity of user intervention is removed and the software application transitions to a signed-in state without prompting action on the part of the user. If the automatic sign-in condition is enabled, and security criteria are met, a signed-in state is achieved when the software application having secured features is launched.

Once the credential is validated, authentication server 60 returns an encrypted cookie to the client computer 20. The encrypted cookie gives the client computer 20 access to secured services and websites. Once the memory for the software application receives the encrypted cookie, client computer 20 may access secured sites and services through the software application via the network 40 without authenticating the credential again during a signed-in session. However, if the user exits the software application and starts the secured features within software application again, the user will be prompted to enter a credential unless automatic sign-in is active and enabled within the software application on client computer 20.

Figure 2:
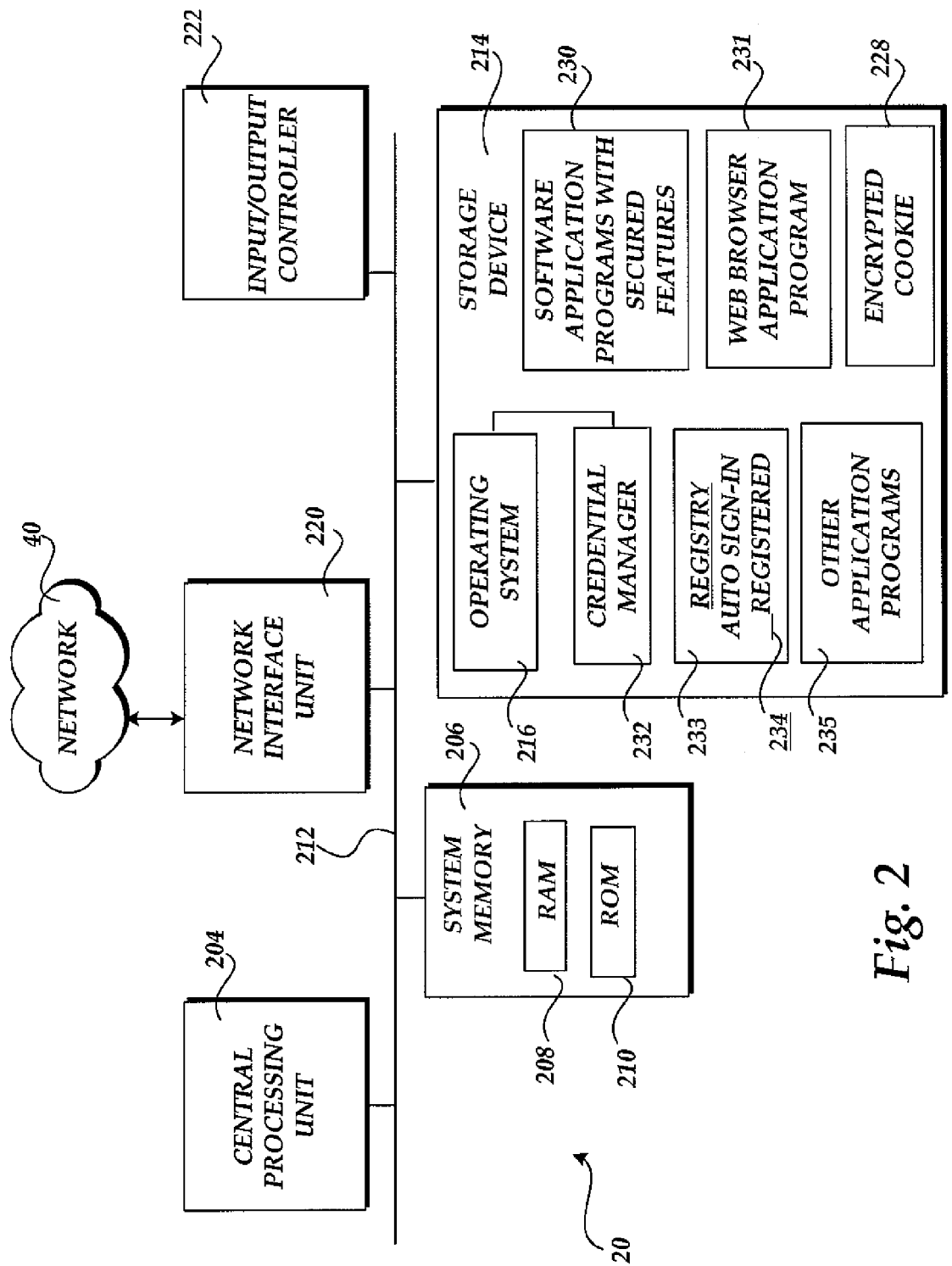
FIG. 2 illustrates one computing environment in which the invention may be implemented.

FIG. 2 illustrates a suitable computing environment in which embodiments of the invention may be implemented. One embodiment of the invention will be described in the general context of computer-executable instructions being executed by a personal computer. Those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network.

With reference to FIG. 2, an exemplary system for implementing the invention includes a general purpose computing device in the form of a conventional client computer 20, including a processing unit 204, a system memory 206, and a system bus 212 that couples various system components including the system memory to the processing unit 204. The system bus 212 may be any of several types of bus structures including a memory bus or memory controller, a peripheral bus, and a local bus using any of a variety of bus architectures. The system memory includes read only memory (ROM) 210 and random access memory (RAM) 208. A basic input/output system 222 (BIOS), containing the basic routine that helps to transfer information between elements within the client computer 20, such as during start-up, is stored in ROM 210.

The client computer 20 further includes a storage device 214 for storing an operating system 216, software application programs with secured features 230, such as OFFICE from MICROSOFT CORPORATION of Redmond, Wash., other application programs 235, a standard Web browser application program such as INTERNET EXPLORER from MICROSOFT CORPORATION of Redmond, Wash., and registry information, wherein an encrypted credential is written and an automatic sign-in enable mechanism is registered. The operating system 216 works in conjunction with a credential manager 232, which is a mechanism used to securely store credentials on the client computer 20. Further the operating system 216 works in conjunction with an encrypted cookie 228 that is sent from authentication server 60. The encrypted cookie 228 gives the client computer 20 access to secured services and sites running on the network 40.

An encrypted cookie 228 may be obtained after the user starts and signs-in to one of the software application having secured features 230 by entering a credential when prompted. If a condition of automatic sign-in is enabled when the user starts one of the software applications 230, the sign-in or login prompt is bypassed and the client computer 20 signs-in to the software application without intervention from the user. When a condition of automatic sign-in or login is enabled an auto sign-in or login registry key 234 is active and an authenticated credential is stored in the credential manager 232. The registry key 234 written in home HKEY current user (hkcu) has roaming characteristics that may follow a user profile to other client computers, therefore enabling the roaming characteristics of the automatic sign-in or login condition.

The storage device 214 is connected to the CPU 204 through a storage controller (not shown) connected to the bus 212. The storage device 214 and its associated computer-readable media, provide non-volatile storage for the client computer 20. Although the description of computer-readable media contained herein refers to a storage device, such as a hard disk or CD-ROM drive, it should be appreciated by those skilled in the art that computer-readable media can be any available media that can be accessed by the personal computer 20.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

According to various embodiments of the invention, the client computer 20 may operate in a networked environment using logical connections to remote computers through a network 40, such as the Internet. The client computer 20 may connect to the network 40 through a network interface unit 220 connected to the bus 212. It should be appreciated that the network interface unit 220 may also be utilized to connect to other types of networks and remote computer systems. The client computer 20 may also include an input/output controller 222 for receiving and processing input from a number of devices, including a keyboard, mouse, or electronic stylus (not shown in FIG. 2). Similarly, an input/output controller 222 may provide output to a display screen, a printer, or other type of output device.

As mentioned briefly above, a number of program modules and data files may be stored in the storage device 214 and RAM 208 of the client computer 20, including an operating system 216 suitable for controlling the operation of a networked personal computer, such as the WINDOWS XP operating system from MICROSOFT CORPORATION of Redmond, Wash. The storage device 214 and RAM 208 may also store one or more data files. In particular, the storage device 214 and RAM 208 may store the credential that is written to the credential manager 232 and registry data written to the registry 233. Additional details regarding the operation of the automatic sign-in or login operation will be described in greater detail below.

Figure 3:
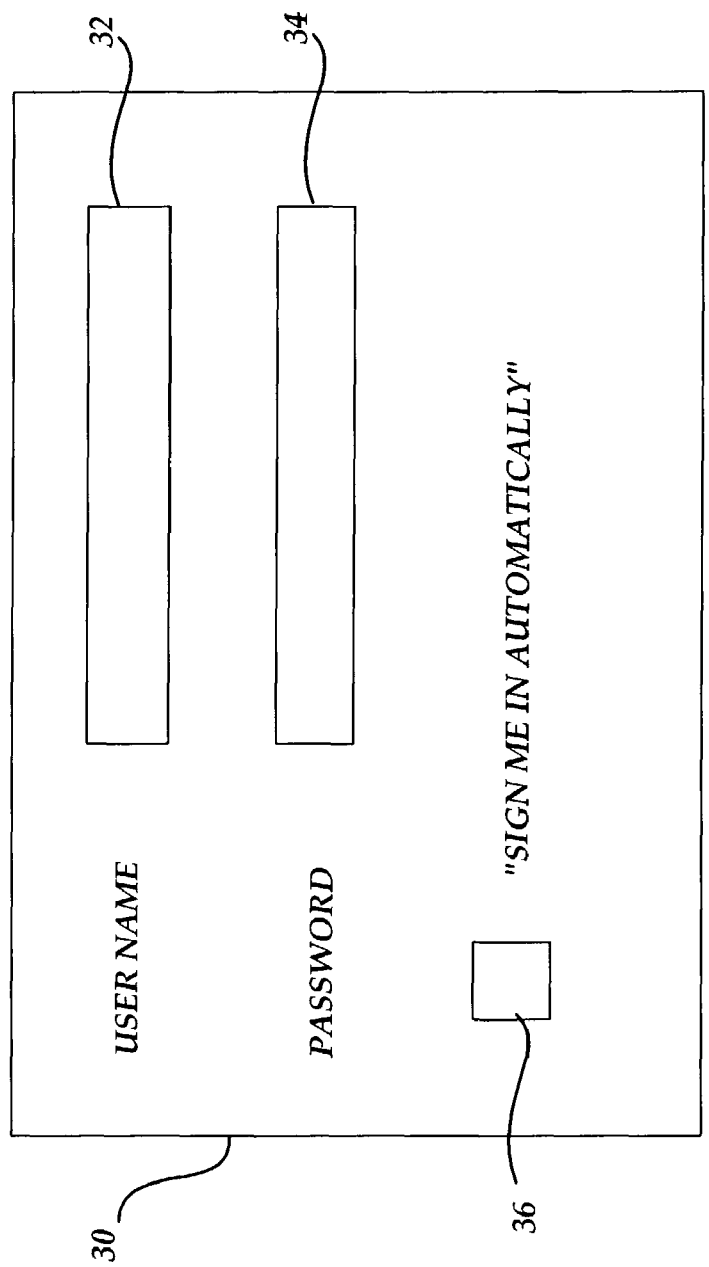
FIGS. 3 and 4 are screen diagrams showing illustrative computer displays provided by an actual embodiment of the present invention.

Referring now to FIG. 3, a screen diagram will be described that shows an illustrative computer display provided by an actual embodiment of the present invention. FIG. 3 shows a user interface 30 that is displayed when a credential is requested in order to access secured features within a software application. After a user name 32 and password 34 are received, an option or checkbox for enabling an automatic sign-in or login condition is presented as a checkbox 36. If the checkbox 36 is affirmed or clicked an operation to enable an automatic sign-in or login condition is initiated.

Figure 4:
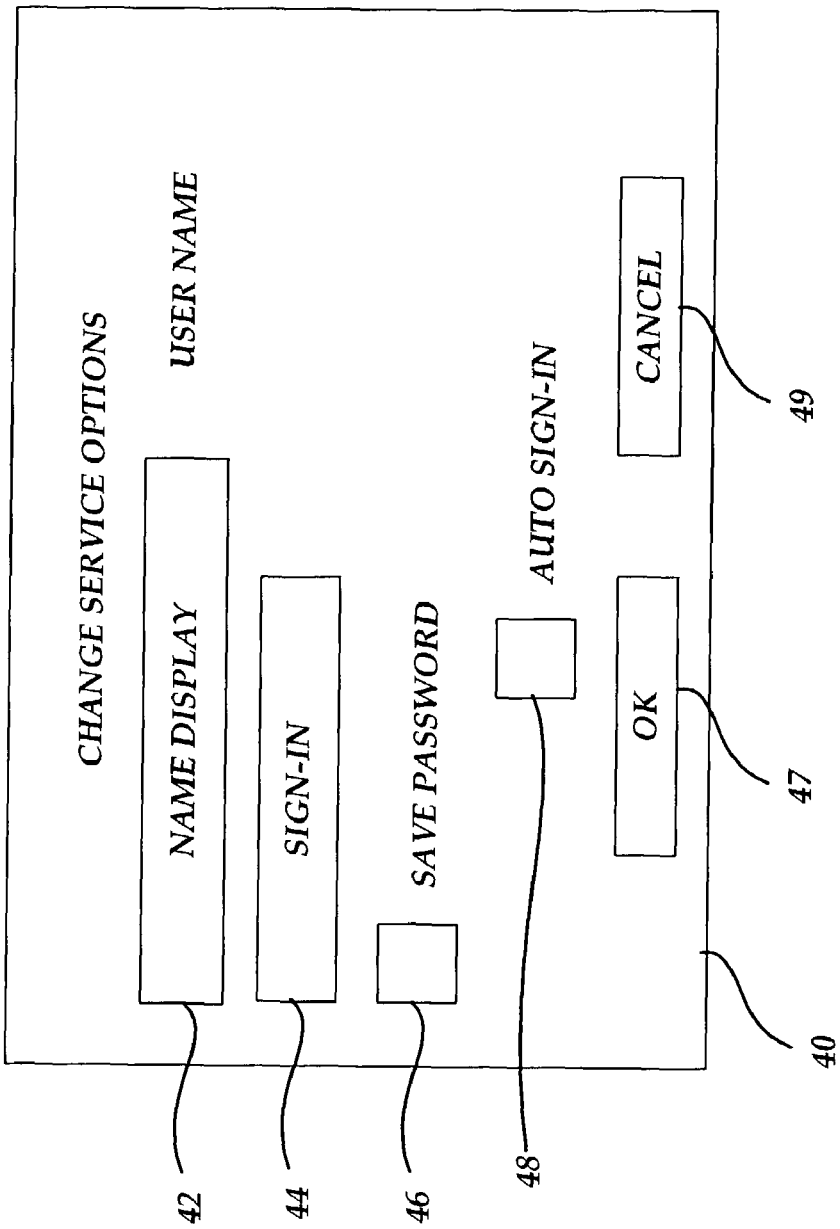

Turning to FIG. 4 a screen diagram will be described that shows an illustrative computer display provided by an actual embodiment of the present invention. FIG. 4 shows a user interface 40 that is displayed in response to a user selecting a service option menu to review or modify client computer 20 preferences for interacting with network services and sites. Alternatively, an automatic sign-in condition may be initiated from user interface 40. If an automatic sign-in condition has not been enabled, a user name 42, an option to save the password, and the auto sign-in option 48 are displayed with blank fields. To initiate the operation to enable the automatic sign-in condition the username 42, save password 46 and the auto sign-in fields are filled in and affirmed or activated. The user name is filled by clicking the Sign-In button 44 which displays the user interface 30 allowing a user to enter a user name and password.

If the save password option 46 is affirmed without automatic sign-in 48 being affirmed, the sign-in or login operation will still display a request prompt for user intervention. For instance the user may be required to click on a "Sign-In" button on the user interface. Further, the auto sign-in option 48 is grayed as inactive until the save password option 46 is affirmed. If the user selects Sign-In 44, a user interface 30 to enter a credential will be displayed. Additional details regarding enabling an automatic sign-in or login condition and signing-in without user intervention will be provided below.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 5:
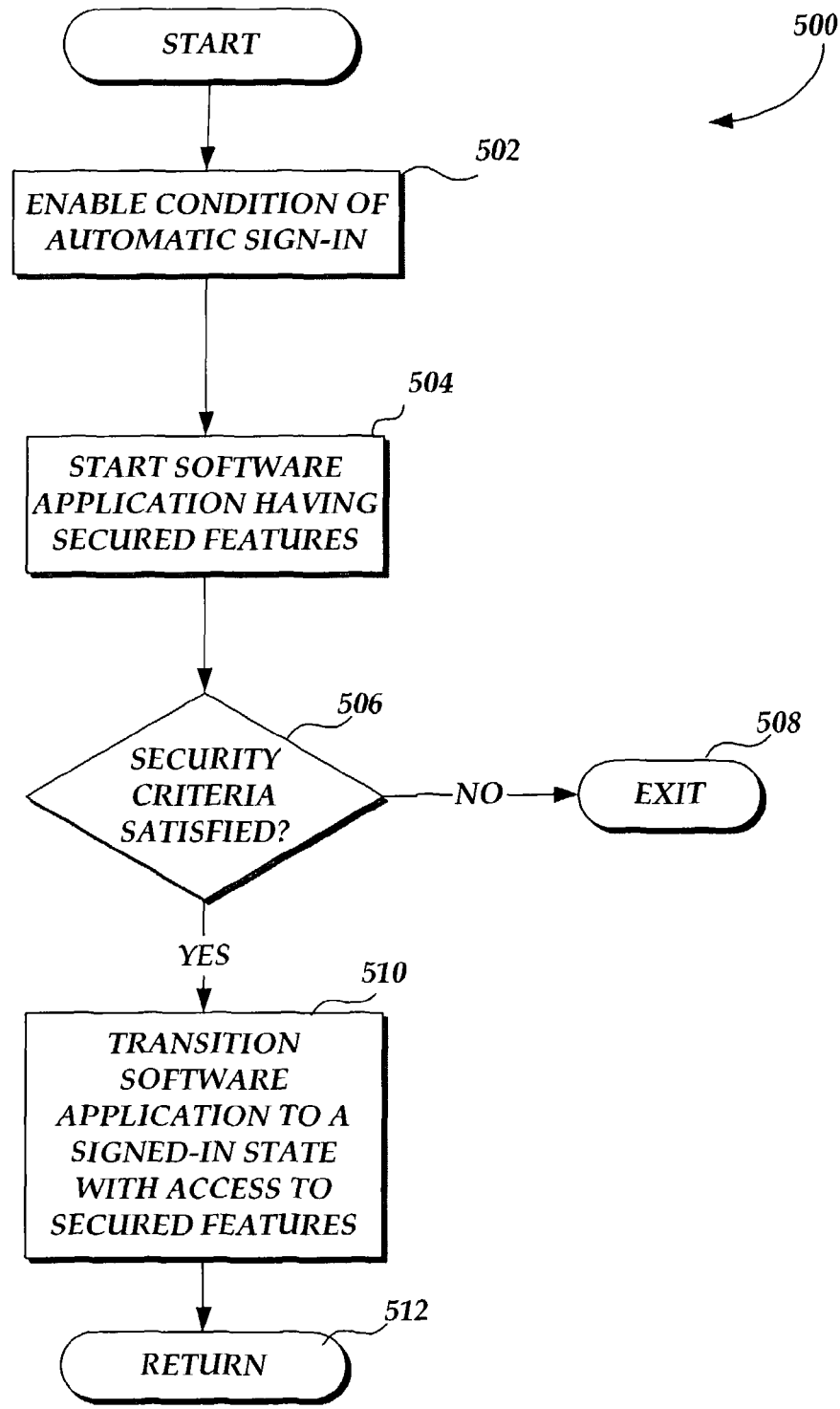
FIG. 5 illustrates a flow of operations to perform sign-in to a software application having secured features in one embodiment of the present invention.
Figure 6:
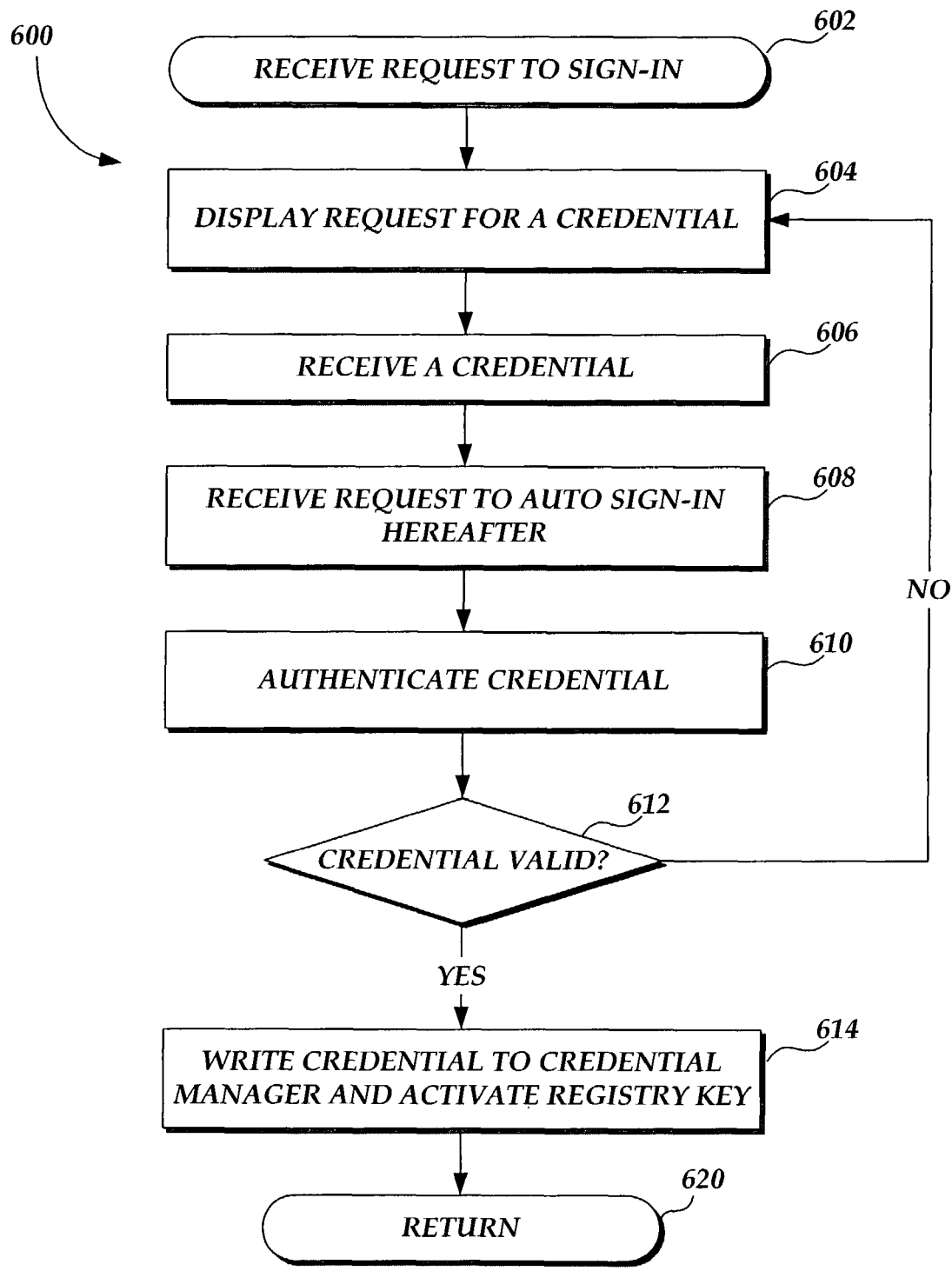

FIG. 5 illustrates an operational flow 500 executed or performed to automatically sign-in or login to a software application having secured features without prompting user intervention. The operational flow 500 starts with an enabling operation 502 whereby an automatic sign-in condition is registered. Referring to FIG. 6 an operation flow 600 illustrates an embodiment of the present invention in enabling operation 502 where an automatic sign-in or login condition is enabled from a credential request prompt 30 displayed in display operation 604 after a request to sign-in for access to secured features in receipt operation 602. The enabling of an automatic sign-in condition may be performed by displaying a request 30 to sign-in or login for access to the secured software application, receiving a credential 32 and 34 for signing-in logging-in to a software application having secured features in receipt operation 606, and receiving a request 36 to hereafter sign-in or login to software applications having secured features automatically in receipt operation 608. Receiving a request may be accomplished by a user clicking on a "sign me in automatically" checkbox.

Next the automatic sign-in condition is further enabled by authenticating the credential in authentication operation 610 and detecting whether the credential is valid in detect operation 612. Here the encrypted credential is transmitted to authentication server 60 where a determination is made as to whether the credential is valid. If the credential is not valid, operational flow 600 branches back to display operation 604. However if the credential is valid operation flow 600 proceeds by storing the credential 32 and 34 in a credential manager 232 and activating registry key 233 in writing operation 614.

At this point the automatic sign-in condition is enabled. Operation control returns to other routines at connector 620.

Turning back to FIG. 5, after the automatic sign-in condition has been enabled in enable operation 502, the software application is started or launched in operation 504 while in the automatic sign-in condition. Detect operation 506 then determines whether security criteria are satisfied. Security criteria may comprise a network connection being detected, a valid credential being stored, the registry key being active, a lock being used, and more. If detect operation 506 detects that the security criteria are not satisfied, operational flow 500 exits at operation 508.

If detect operation 506 detects that the security criteria are satisfied, the software application transitions to a signed-in state at transition operation 510, thereby granting access to secured features without prompting manual intervention to enter a credential or click on a sign-in button. Operation control returns to other routines at connector 512.

Figure 7A:
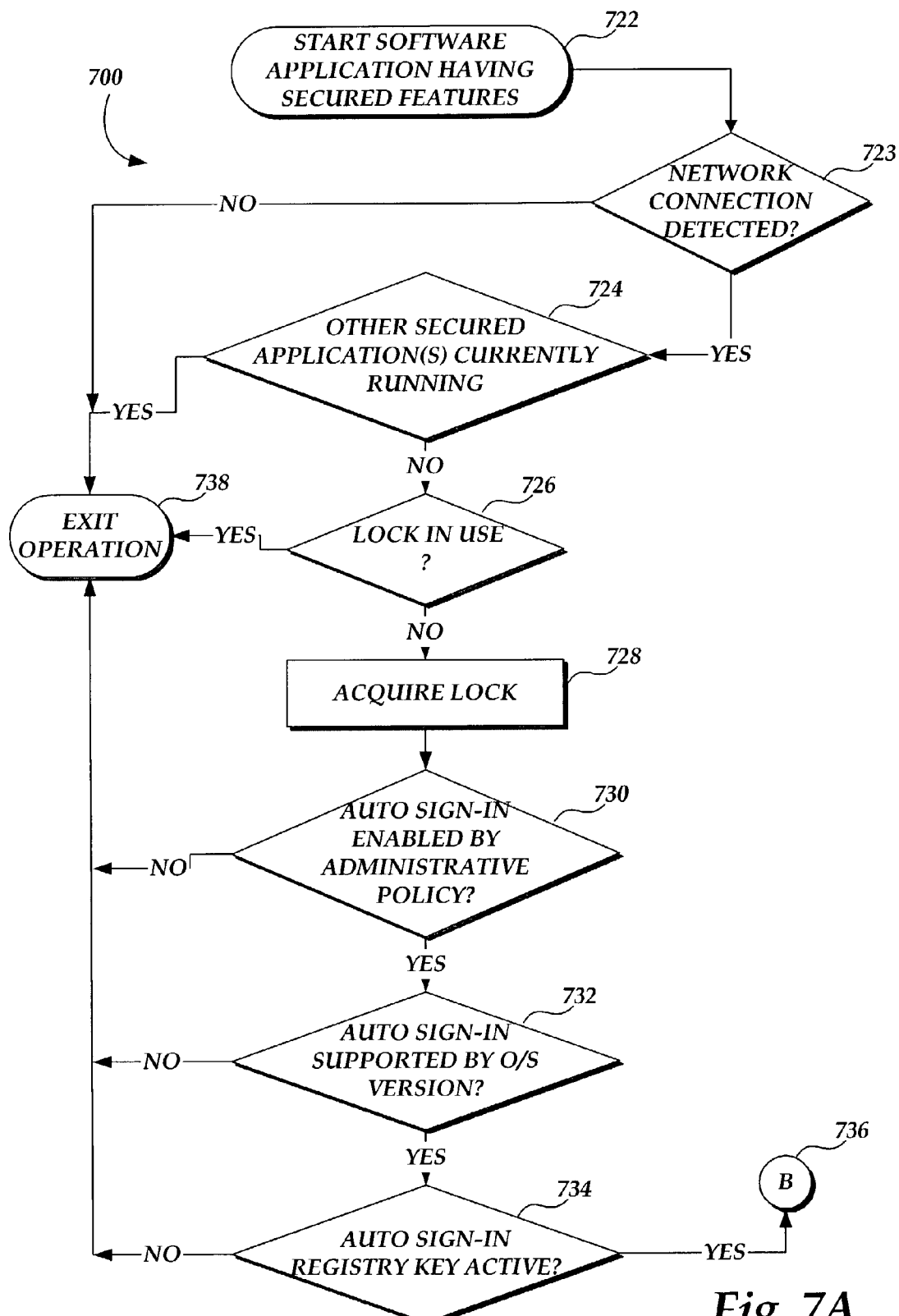
FIGS. 7A-B illustrate another embodiment of the present invention where a software application having secured features is transitioned to a signed-in state based on specific security criteria and conditions being satisfied.
Figure 7B:
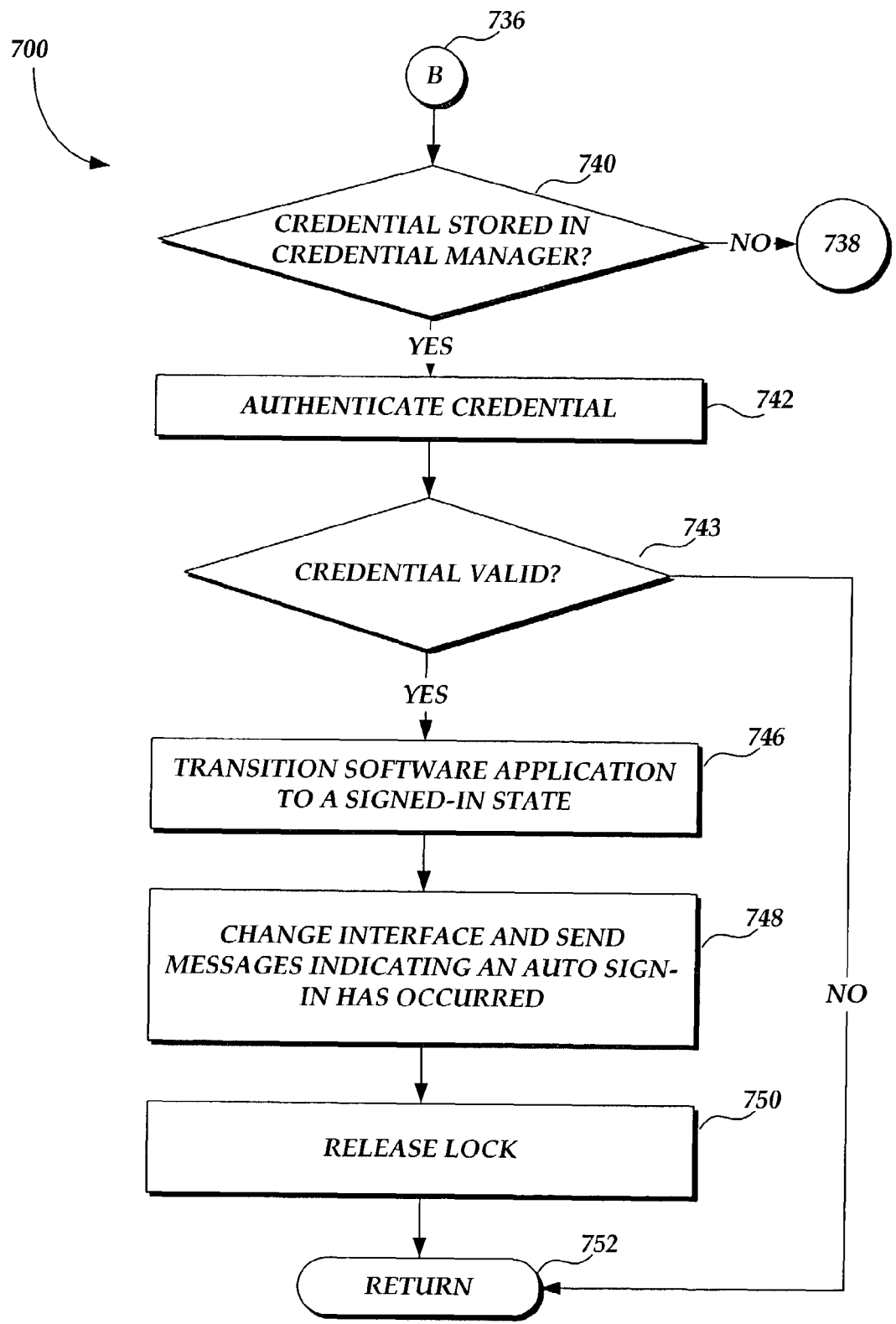

FIGS. 7A-B illustrate another embodiment of the present invention where a software application having secured features is transitioned to a signed-in or logged-in state in operational flow 700 based on starting the software application with start operation 722 and specific security or automatic login criteria and conditions being satisfied. After starting the software application detection operation 723 determines whether a network connection exists. If the network connection is not present the automatic sign-in condition is hindered and control is returned to other routines at connector 738.

If the network connection is present, operational flow 700 then advances to detection operation 724 where a determination is made as to whether one or more other software applications having secured features are currently in a running or open state. If one or more other applications are in a running or open state, operational flow 700 returns control to other routines at connector 738. If other applications are not in a running or open state, detection operation 726 determines whether a lock is currently being used to sign-in or login another software application. If the lock is not being used, the locking operation 728 acquires the lock so criteria detection may be continued without interruption by other applications signing-in.

Operational flow 700 continues with detection operation 730 determining whether an automatic sign-in or login condition has been enabled by administrative policy. A network administrator may disable auto sign-in or login functionality by setting a registry key in the client computer system registry section under administrator control. This feature may primarily be used for public, corporate network, or KIOSK computers having multiple users. The default setting for this key enables functionality. If the automatic sign-in or login condition is enabled at detection operation 730, detection operation 732 determines whether the version of the operating system supports the automatic sign-in condition. Operating system versions should be equipped to support an automatic sign-in or login condition.

If the operating system version supports the automatic sign-in or login condition, operational flow 700 continues with detection operation 734 determining if the registry key 230 is active. If the registry key 230 is active, detection operation 740 determines if a credential is stored in the credential manager. The credential being present, the authentication operation 742 proceeds to authenticate the credential. Here the credential is transmitted to authentication server 60 where detection operation 743 determines if the credential is valid. If the credential is not valid an error is displayed and operational flow 700 branches to connector 752 where operation control is returned to other routines. If the credential is valid, an encrypted cookie is transmitted from authentication server 60 to the client computer 20 and the software application transitions to a signed-in state at transition operation 746.

Operational flow 700 then proceeds from transition operation 746 to messaging operation 748 where the user interface is changed to indicate a signed-in or logged-in state for the software application and other applications receive notice that an auto sign-in or login has occurred. Once the other software applications have been notified, locking operation 750 releases the lock. Next operation control is returned to other routines at connector 752.

While the invention has been particularly shown and described with reference to embodiments thereof, it will be understood by those skilled in the art that various other changes in the form and details may be made therein without departing from the spirit and scope of the invention.

We claim:

1. A method for signing-in to a software application, wherein the software application has one or more secured features, comprising:

enabling, on a client computer, an automatic sign-in condition in the software application to allow the software application to automatically transition to a signed-in state when one or more security criteria are satisfied, the automatic sign-in condition being enabled upon at least one of initial system setup of the client computer and through a service options menu on the client computer, the service options menu comprising an interface displaying a field for a user name, a field for an option to save a password and a field for an auto-sign in option;

starting the software application without prompting action on the part of a user when in the automatic sign-in condition;

detecting whether one or more security criteria are satisfied when the software application is started and is in the automatic sign-in condition; and in response to at least one of the one or more security criteria being satisfied, automatically transitioning the software application to the signed-in state without prompting action on the part of the user when in the automatic sign-in condition and granting the software application access to the secured features, wherein the security criteria comprises a key, associated with a user profile, being set to enable the automatic sign-in condition and a credential associated with the user being stored in a credential manager, the key being associated with the user profile to provide roaming characteristics utilized to allow the user to access secured features from a plurality of network client computers, the roaming characteristics enabling the automatic sign-in condition to roam between the plurality of network client computers without the user being required to reenter the credential to access the secured features of the software application.

2. The method of claim 1, wherein one of the one or more security criteria being satisfied is a network connection being detected.

3. The method of claim 1, wherein the one or more security criteria being satisfied includes no other software application having secured features being in a running state when the software application starts.

4. The method of claim 1, wherein the one or more security criteria being satisfied includes a lock being used to prevent simultaneous sign-in of two or more software applications.

5. The method of claim 1, wherein the one or more security criteria being satisfied includes the automatic sign-in condition being enabled by a system administrative policy.

6. The method of claim 1, wherein the one or more security criteria being satisfied includes a credential being stored to sign-in for access to the secured features of the software application.

7. The method of claim 1, wherein the one or more security criteria being satisfied includes authenticating the credential and the credential being valid.

8. The method of claim 1, wherein the security criteria comprises:
   a network connection being detected;
   a lock being used to prevent simultaneous sign-in to two or more software applications;
   the automatic sign-in condition being enabled by a system administrative policy;
   a credential being stored to sign-in for access to the secured features of the software application; and
   authenticating the credential and the credential being valid.

9. The method of claim 1, wherein the software application is part of a suite of two or more software applications having secured features, wherein an operating system supports the automatic sign-in condition, and wherein the security criteria further comprises no one or more other software applications within the suite being in a running state when the software application starts.

10. The method of claim 1, wherein the automatic sign-in condition may be disabled by the system administrative policy.

11. The method of claim 1, wherein the secured features comprise one or more host websites and one or more host services.

12. The method of claim 1, further comprising:
   receiving a request to access the secured features within the software application;
   in response to the request, transmitting authentication information and accessing the secured features.

13. The method of claim 12, wherein authentication information comprises an encrypted cookie received from an authentication server.

14. The method of claim 1, wherein enabling an automatic sign-in condition comprises:
   receiving a request to display the service options menu;
   displaying the service options menu;
   receiving a request to hereafter automatically sign-in for access to one or more secured features within one or more software applications;
   displaying a request for a credential;
   receiving the credential for signing-in to access the secured features within the software application;
   authenticating the credential and detecting whether the credential is valid; and
   in response to detecting that the credential is valid, storing the credential in a credential manager and activating the key.

15. The method of claim 14, wherein the request to hereafter automatically sign-in comprises an option that allows the password to be saved and an option that allows the user to be automatically signed in and affirmed by the user within the service options menu.

16. The method of claim 14, further comprising:
   displaying an option to change the credential;
   receiving a request to change the credential
   in response to receiving the request to change the credential, displaying a request for a different credential;
   receiving and storing the different credential for signing-in to access the secured features of the software application;
   in response to receiving the different credential, removing the credential; and storing the different credential as the credential.

17. The method of claim 16, wherein the credential is stored in an encrypted format.

18. The method of claim 1, wherein enabling the automatic sign-in condition comprises the operations of:
   receiving a request to access the secured features within the software application;
   displaying a request for a credential;
   receiving the credential for signing-in to access the secured features of the software application;
   receiving a request to hereafter automatically sign-in for access to one or more secured features within one or more software applications having secured features;
   authenticating the credential and detecting whether the credential is valid; and
   in response to detecting that the credential is valid, storing the credential in the credential manager and activating the key.

19. The method of claim 18, wherein the request to hereafter automatically sign-in comprises the user clicking a checkbox to make the request automatic.

20. The method of claim 18, wherein the credential is stored in an encrypted format.

21. The method of claim 18, wherein the credential comprises the user name and the password.

22. The method of claim 21, further comprising:
   activating an interface of the software application to indicate a signed-in state;
   sending one or more messages indicating that an automatic sign-in has occurred; and releasing use of the lock.

23. A computer storage medium readable by a computing system and encoding instructions for executing a computer process for logging in to a software application, wherein the software application has one or more secured features, said computer process comprising:
   enabling, on a client computer, an automatic sign-in condition in the software application to allow the software application to automatically transition to a signed-in state when one or more security criteria are satisfied, the automatic sign-in condition being enabled upon at least one of initial system setup of the client computer and through a service options menu on the client computer, the service options menu comprising an interface displaying a field for a user name, a field for an option to save a password and a field for an auto-sign in option;
   launching the software application without prompting action on the part of a user when in the automatic sign-in condition;
   determining whether one or more security criteria are satisfied when the software application is launched and is in the automatic sign-in condition; and
   in response to at least one of the one or more security criteria being satisfied, automatically transitioning the software application to the signed-in state without prompting action on the part of the user when in the automatic sign-in condition and granting the software application access to the secured features, wherein the security criteria comprises a key, associated with a user profile, being set to enable the automatic sign-in condition and a credential associated with the user being stored in a credential manager, the key being associated with the user profile to provide roaming characteristics utilized to allow the user to access secured features from a plurality of network client computers, the roaming characteristics enabling the automatic sign-in condition to roam between the plurality of network client computers without the user being required to reenter the credential to access the secured features of the software application.

24. The computer storage medium of claim 23, wherein the automatic sign-in condition may be disabled by a system administrative policy.

25. The computer storage medium of claim 23, wherein the computer process further comprises:
   receiving a request to access a secured feature within the software application and in response to the request, transmitting authentication information and accessing the secured feature.

26. The computer storage medium of claim 23, wherein the enabling operation of the computer process comprises:
   receiving a request to access the secured features within the software application;
   displaying a request for a credential;
   receiving the credential for signing-in to access the secured features of the software application;
   receiving a request to hereafter access one or more secured features of one or more software applications, by launching the software applications;
   authenticating the credential and detecting whether the credential is valid; and
   in response to detecting that the credential is valid, storing the credential in the credential manager and activating the automatic sign-in key whereby the automatic sign-in condition is enabled.

27. The computer storage medium of claim 26, wherein the credential is stored in an encrypted format and wherein the automatic sign-in key is written in home HKEY current user.

28. The computer storage medium of claim 26, wherein the request to hereafter automatically sign-in comprises the user clicking a checkbox to make the request automatic.

29. The computer storage medium of claim 26, wherein the request to hereafter automatically sign-in comprises an option that allows the password to be saved and an option that allows the user to be automatically signed in after being activated by the user within a service options menu.

30. The computer storage medium of claim 23, wherein the security criteria comprises:
   a network connection being detected;
   a lock being used to prevent simultaneous sign-in to two or more software applications;
   the automatic sign-in condition being enabled by a system administrative policy;
   a credential being stored to sign-in for access to the secured features of one or more software applications; and
   authenticating the credential and the credential being valid.

31. The computer storage medium of claim 30, wherein the software application is part of a suite of two or more software applications having secured features, wherein an operating system supports the automatic sign-in condition, and wherein the security criteria further comprises no one or more other software applications within the suite being in an open state when the software application starts.

32. The computer storage medium of claim 30, wherein the credential comprises the user name and the password.

33. The computer storage medium of claim 30, further comprising:
   changing an interface of the software application to indicate a signed-in state;
   sending one or more messages indicating that an automatic sign-in has occurred; and
   releasing use of the lock.

34. A method for automatic login to access one or more secured features within a software application comprising:
   authenticating, on a client computer, an automatic login condition in the software application to allow the software application to automatically transition to a signed-in state when one or more security criteria are satisfied, the automatic login condition being enabled upon at least one of initial system setup of the client computer and through a service options menu on the client computer, the service options menu comprising an interface displaying a field for a user name, a field for an option to save a password and a field for an auto-sign in option;
   launching the software application without prompting action on the part of a user while in the automatic login condition;
   detecting whether one or more automatic login criteria are satisfied when the software application is launched and is in the automatic login condition; and
   in response to at least one of the one or more automatic login criteria being satisfied, automatically transitioning the software application to the signed-in state without prompting action on the part of the user when in the automatic sign-in condition and granting the software application access to the secured features, wherein when the automatic login condition is enabled, a key, associated with a user profile, is set and a credential associated with the user is stored in a credential manager, the key being associated with the user profile to provide roaming characteristics utilized to allow the user to access secured features from a plurality of network client computers, the roaming characteristics enabling the automatic sign-in condition to roam between the plurality of network client computers without the user being required to reenter the credential to access the secured features of the software application.

35. The method of claim 34, further comprising:
   receiving a request to access a secured feature within the software product;
   in response to the request, transmitting authentication information and accessing the secured feature.

36. The method of claim 34, wherein the one or more automatic login criteria comprises:
   a network connection being detected;
   a lock being acquired to prevent simultaneous login of two or more secured applications;
   the automatic login condition being enabled by a network administrative policy;
   a credential being stored to login for access to the secured features of the software application; and
   authenticating the credential and the credential being valid.

37. A system for signing-in to a software application, wherein the software application has one or more security criteria and one or more secured features, comprising:
   a memory unit storing an authenticated sign-in condition; and
   a processing unit enabling, on a client computer, an automatic sign-in condition in the software application to allow the software application to automatically transition to a signed-in state when one or more security criteria are satisfied, the automatic sign-in condition being enabled upon at least one of initial system setup of the client computer and through a service options menu on the client computer, the service options menu comprising an interface displaying a field for a user name, a field for an option to save a password and a field for an auto-sign in option, starting the software application without prompting action on the part of the user when in the automatic sign-in condition and detecting whether one or more security criteria are satisfied when the software application is started and is in the automatic sign-in condition, and in response to at least one of the one or more security criteria being satisfied, the processing unit automatically transitioning the software application to the signed-in state without prompting action on the part of the user when in the automatic sign-in condition and granting the software application access to the secured features, wherein when the authenticated sign-in condition is enabled, a key, associated with a user profile, is set and a credential associated with the user is stored in a credential manager, the key being associated with the user profile to provide roaming characteristics utilized to allow the user to access secured features from a plurality of network client computers, the roaming characteristics enabling the authenticated sign-in condition to roam between the plurality of network client computers without the user being required to reenter the credential to access the secured features of the software application.

38. The system of claim 37, further comprising:
a display unit to indicate the signed-in state and network activity

* * * * *